July 1, 1969    R. T. BEAZLEY ET AL    3,452,415

METHOD OF MAKING A JOINT OF THE BALL AND SOCKET TYPE

Filed Nov. 25, 1966

INVENTORS
Rodney Thomas Beazley
Robert Hunter Thynne Armstrong
By Pierce, Schiffler & Parker
ATTORNEYS United States Patent Office 3,452,415
Patented July 1, 1969

3,452,415
METHOD OF MAKING A JOINT OF THE BALL AND SOCKET TYPE
Rodney Thomas Beazley, Kent, and Robert Hunter Thynne Armstrong, London, England, assignors to The Glacier Metal Company Limited
Filed Nov. 25, 1966, Ser. No. 596,930
Int. Cl. B21d 53/10; B23p 11/00
U.S. Cl. 29—149.5                           4 Claims

---

ABSTRACT OF THE DISCLOSURE

A ball and socket joint is formed by placing the ball member within a cylindrical blank which is within a die and shaping the blank around the ball by deforming the blank endwise thereby maintaining its outer cylindrical surface unchanged. The blank may consist of two cylindrical parts or two part cylindrical parts that together form a cylinder and the blank may be lined with a self-lubricating layer which remains in the finished joint.

---

Figure 1:
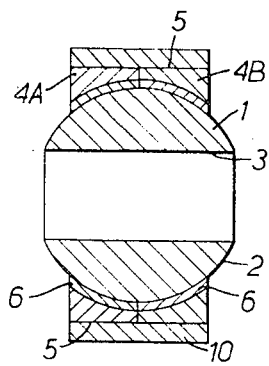

This invention relates to a method of making bearing assemblies of the kind usually and hereinafter called ball and socket joints and to ball and socket joints made by that method, the term "ball and socket joint" being used for convenience to mean any bearing assembly comprising an inner member (hereinafter for convenience called the ball member) having an annular bearing surface which is of circular cross-section in planes at right angles to an axis about which said surface is symmetrical and which, relative to planes containing that axis is of curved convex form such that the annular bearing surface has its largest diameter in planes perpendicular to said axis at an intermediate point in its length, and an annular outer member surrounding said inner member and with its inner surface constituting an annular bearing surface in sliding engagement with the annular bearing surface of the ball member. The ball member of such bearing assemblies usually has a shank or pair of coaxial shanks projecting radially from it or is provided with a bore through which such a shank can pass with a close fit.

It is known to manufacture ball and socket joints by arranging the ball member within or partially within a tubular blank and then deforming the blank to convert it into the socket of the joint by pressure applied in directions substantially normal to the axis of the cylindrical blank, which axis passes through the centre of curvature of the ball member and is coincident with the longitudinal axis of the shank or shanks or the bore of the ball member during the deforming operation, so that the internal surface of the blank is caused to assume a part-spherical form conforming closely to the part spherical surface of the ball. It will be seen that as the blank is deformed to form the socket by such deforming operation the shape of its outer surface is changed since the material is deformed to the greatest extent adjacent to the ends of the blank and progressively less as the plane in which the inner surface of the blank initially lies closest to the surface of the ball is approached.

Moreover when as is often the case the socket is required to fit into and be secured within an outer casing, the outer casing has to be machined to conform with the shape of the outer surface of the socket, and this may incur expensive machining operations.

It is an object of the present invention to provide a method of making a ball and socket joint which will be comparatively simple and inexpensive and will provide a form of joint which will in general meet practical requirements to a satisfactory degree.

In the method of making a bearing assembly of the kind referred to according to the present invention the ball member is located within a cylindrical blank having an internal diameter approximately equal to the largest external diameter of the ball member and the cylindrical blank is then deformed to form the outer member by applying to said blank end pressure while restraining the blank from radial expansion in such a manner as to cause the inner surface of the blank to take the required form conforming to the form of the bearing surface of the ball member with which it is brought into engagement during such deformation while its outer surface remain substantially cylindrical.

The step of deforming the cylindrical blank by end pressure in the manner referred to will hereinafter for convenience be referred to as the coining process.

In most cases the bearing surfaces of the ball member and the outer member will be part spherical so as to provide for a degree of universal relative pivotal movement between the ball member and the outer member aboutt he common centre of curvature of the surfaces. In other cases, however, the bearing surfaces of the ball member and the outer member may have a cross-section in planes containing the axis of the outer member (that is to say the axis of the outer cylindrical surface of the outer member) which is ellipsoidal or of other curved form allowing for relative rotation between the ball member and the outer member while resisting relative movement in directions parallel to such axis, and not providing for any large degree of self alignment.

It will be understood that during the coining process the longitudinal axis of the shank or shanks of the ball member or the bore for accommodating such a shank will usually be coincident with the axis of the outer member, although this may not be necessary where the bearing surface of the ball member is part spherical and the dimensions of the part spherical surface of the ball member and of the blank are such that the whole internal surface of the blank can engage the part spherical surface of the ball member during the coining process in spite of the two axes in question lying at a small angle to one another.

In performing the method according to the invention the reduction in axial length of the cylindrical blank during the deforming operation will usually be less than 50% and will preferably lie between 5% and 20%.

In any case the cylindrical blank may be in the form of a complete annulus or may comprise a plurality of part cylindrical elements, which when placed together form a complete annulus.

The invention is particularly but not exclusively applicable to the manufacture of ball and socket joints wherein the inner surface of the socket is formed of a self-lubricating material or of a material which, when provided with an initial charge of lubricant, can operate satisfactorily over long periods without the provisions of further lubricant. Thus the cylindrical blank, whether in the form of a complete annulus or a plurality of part cylindrical elements, may comprise an outer metallic layer of a ductile metal capable of the required deformation and having attached to it an inner layer of a material which is to form the bearing surface of the socket and is either of a self-lubricating nature, such as porous bronze impregnated with polytetrafluoroethylene (hereinafter called P.T.F.E.) or a plastic material with or without an initial charge of lubricant. For example the blank may be formed of the material forming the subject of British Patent No. 657,080, or that described in the specification of British Patent No. 1,015,503.

In performing the method according to the invention, and especially when the cylindrical blank employed comprises an outer metallic layer of a ductile metal having attached to it an inner layer of self-lubricating bearing material as above described, the blank, with the ball member within it, will preferably be disposed with a close fit within a die, during the coining process so that the plastic flow imposed upon the blank during such process takes place axially and inwards but not outwards.

In any case, the die may be retained on the outer member after the coining process to constitute a housing forming part of the mechanism in which the joint is eventually incorporated or may be removed leaving the outer member if it is in the form of a complete annulus ready for insertion into a housing forming part of the mechanism in which the joint is to be used. The employment of a die which thus substantially prevents any outward flow of material during the coining process tends to prevent damage to the material of the blank which might otherwise be caused due to parts of it having to flow both inwards and outwards during the coining process.

Figure 2:
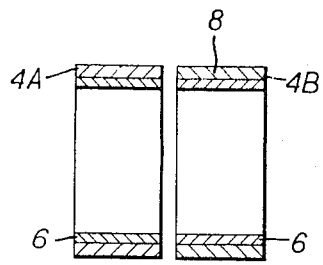
Figure 3:
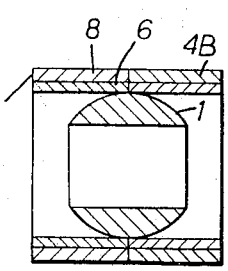
Figure 4:
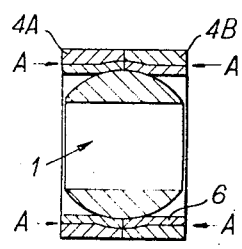
Figure 5:
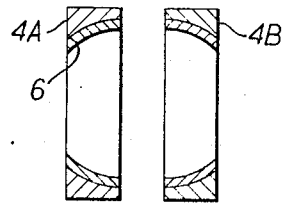
Figure 6:
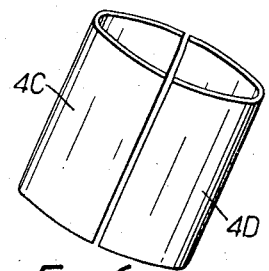
Figure 7:
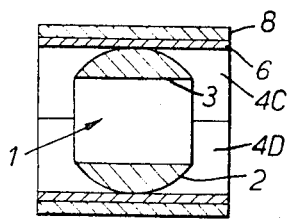
Figure 8:
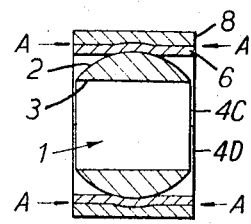
Figure 9:
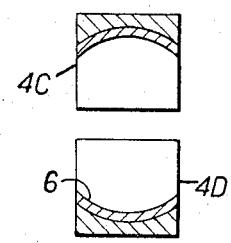

One example of the invention will now be described by way of example with reference to the accompanying drawings, in which:

FIGURE 1 is a cross section showing one form of ball member and its associated socket and surrounding die after manufacture by the method according to the invention, the cross section being in a plane containing the axis of a bore through the ball member, FIGURE 2 is a similar cross section to FIGURE 1 of the blank from which the socket is formed prior to deformation when it is in the form of two cylindrical elements of equal axial length, FIGURES 3 and 4 show successive steps in the manufacture of the joint shown in FIGURE 1, FIGURE 5 is a cross-section through the deformed cylinders of FIGURE 2 in their finished state, FIGURE 6 is a perspective view of an alternative blank formed from two semi-cylindrical elements, FIGURES 7 and 8 are steps in the manufacture of the socket formed from the blank of FIGURE 6, and FIGURE 9 is a similar view to FIGURE 5 of the finished socket.

In the construction shown in FIGURE 1 the ball member 1 has a part-spherical outer surface 2 and bore 3 extending therethrough to receive a shank or rod in known manner, while the socket member comprises two cylindrical elements 4A and 4B of equal axial length which when placed together form an outer layer or part having a cylindrical outer surface 5. Attached to the inner face of each of the two cylindrical elements 4A and 4B is a lining 6 of bearing material arranged to provide, when deformed, a part-spherical inner surface in close sliding engagement with the spherical surface 2 of the ball 1, the socket member being closely surrounded by a cylindrical die 10 the bore of which is the same diameter as the external cylindrical surface of the socket member.

The ball and socket joint shown in FIGURE 1 is manufactured by locating within the two cylindrical elements shown at 4A and 4B in FIGURE 2 in their undeformed state the ball member as shown in FIGURE 3. Each of the elements 4A and 4B is made by being formed by a wrapping process from a suitable flat strip and each element comprises an outer layer 8 of suitable ductile metal to the inner surface of which is attached a layer 6 of self-lubricating material such as porous bronze impregnated with P.T.F.E. as described for example in British Patent No. 657,080 or a plastics materials as described for example in British Patent No. 1,015,503.

In manufacture the ball is located at the centre of the length of the tyo cylindrical elements 4A and 4B, the die 10 is then fitted around the circumference of the cylindrical elements to prevent their radial expansion and the elements then have end pressure applied to them by dies acting on their ends so as to deform them into the form shown in FIGURE 1. This process is generally known as end coining, and is shown in FIGURE 4 where pressure is applied to the ends as shown by the arrows A and in this figure the elements are shown partially deformed.

The dimensions of the two cylindrical elements before the deforming process are chosen so that when placed together the volume of material when deformed by plastic flow in the coining operation fills the spaces between the ball and the die in the manner shown in FIGURE 1 while providing the required axial length for the finished socket.

The die 10 can remain in position after the forming operation and constitute a housing enclosing the complete ball and socket joint, or it can be removed in which case the two cylindrical elements can be separated as shown in FIGURE 5 and the ball removed. In this latter case the ball and socket joints can be assembled as and when required and in addition, the joint can be readily serviced or repaired.

An alternative construction of ball and socket joint is shown in FIGURE 6 when instead of there being two cylindrical elements, 4A and 4B there are two semi-cylindrical elements 4C and 4D which when placed together form a similar cylindrical element to the construction shown in FIGURES 1 to 5 except that it can be separated about the axial plane instead of a radial plane.

The form of arrangement of the joint formed from the elements of FIGURE 6 is similar to that shown in FIGURE 1 and FIGURES 7 and 8 are similar to FIGURES 3 and 4 while FIGURE 9 shows the deformed blanks.

In either construction there may be a plurality of cylinders or of part-cylindrical elements which when placed together from an outer layer with a cylindrical outer surface.

It has been found that the coining operation does not rupture the inner layer of the material of which the socket is formed while moreover in the finished product the thickness of the inner layer of this material is relatively uniform throughout its area, and assuming an appropriate initial thickness, is suitable for satisfactory operation for periods of a length usually representing the required working life of the joints in question.

In some cases as, for example, where the inner layer of the socket is an acetal copolymer as referred to in British Patent No. 912,121 it may be necessary to heat the cylindrical members or elements prior to the deforming operation.

As indicated above, the cylindrical die may constitute a housing forming part of the mechanism in which the joint is eventually incorporated although in most cases it may be preferable to remove the die after the coining process so that the joint may be assembled when it is required and it is only necessary to put an appropirate ball in position and to place the elements forming the socket together and insert it into a housing forming part of the mechanism in which the joint is to be incorporated.

The novel aspects of the joint structure per se are claimed in a divisional application Ser. No. 738,655 filed June 20, 1968.

What we claim as our invention and desire to secure by Letters Patent is:

1. The method of making a bearing assembly comprising an inner member having an annular bearing surface which is of circular cross-section in planes at right angles to an axis about which said surface is symmetrical and which in planes containing that axis is of curved convex form such that the annular bearing surface has its largest diameter at an intermediate point in its length, and an annular outer member surrounding said inner member and with its inner surface constituting an annular bearing surface in sliding engagement with the annular bearing surface of the outer member, which comprises locating the inner member within a cylindrical blank comprising at least two separable elements and having an internal diameter equal to the largest external diameter of the inner member, deforming the cylindrical blank to form the outer member by applying to said blank end pressure while restraining it from radial expansion thereby causing the inner surfaces of the separable elements constituting the blank to take the form of the parts of the bearing surface of the inner member with which they are brought into engagement during such deformation while the outer surface of the blank remains substantially cylindrical, and the elements remain separable.

2. The method of making a bearing assembly as claimed in claim 1 in which the cylindrical blank, prior to the application of end pressure is located within a die which closely surrounds it so as substantially to prevent radial extension of the blank.

3. The method of making a bearing assembly as claimed in claim 2 in which, after the application of the end pressure, the deformed blank with the inner member within it is removed from the die.

4. A method of making a bearing assembly as claimed in claim 2 in which after the application of end pressure the deformed blank and die form a permanently connected unit so that the die may constitute a housing forming part of a mechanism in which the assembly is incorporated.

References Cited

UNITED STATES PATENTS

| | | | |
|---|---|---|---|
| 2,366,668 | 1/1945 | Heim | 29—149.5 |
| 2,665,956 | 1/1954 | Heim | 308—72 |
| 2,728,975 | 1/1956 | Potter | 29—149.5 |
| 2,904,874 | 9/1959 | Norton | 29—441 X |
| 2,947,063 | 8/1960 | Teeple | 29—149.5 |

THOMAS H. EAGER, *Primary Examiner.*

U.S. Cl. X.R.

29—441; 287—88; 308—72